(12) United States Patent
Holmberg

(10) Patent No.: US 7,647,922 B2
(45) Date of Patent: *Jan. 19, 2010

(54) ADAPTOR FOR DEVICE MOUNT

(76) Inventor: Larry Holmberg, P.O. Box 63, Wascott, WI (US) 54890

( * ) Notice: Subject to any disclaimer, the term of this patent is extended or adjusted under 35 U.S.C. 154(b) by 19 days.

This patent is subject to a terminal disclaimer.

(21) Appl. No.: 11/478,943

(22) Filed: Jun. 30, 2006

(65) Prior Publication Data

US 2008/0000465 A1 Jan. 3, 2008

(51) Int. Cl.
*F41B 5/00* (2006.01)
(52) U.S. Cl. .......................................... 124/86; 124/88
(58) Field of Classification Search .................. 124/86, 124/87, 88, 89; 33/265; 403/192, 196, 398, 403/399
See application file for complete search history.

(56) References Cited

U.S. PATENT DOCUMENTS

| | | | |
|---|---|---|---|
| 0,521,761 A | 6/1894 | Day | |
| 521,761 A * | 6/1894 | Day | 403/192 |
| 0,899,639 A | 9/1908 | Vibber | |
| 899,639 A * | 9/1908 | Vibber | 285/154.4 |
| 1,452,651 A | 4/1923 | Norrlin | |
| 1,480,147 A * | 1/1924 | Brandt | 403/398 |
| 2,101,479 A | 12/1937 | Schenk | |
| 2,450,466 A | 10/1948 | Carlson | |
| 2,814,118 A | 11/1957 | Evans et al. | |
| 3,427,102 A | 2/1969 | Wade | |
| 3,483,623 A | 12/1969 | Kruzell | |
| 3,684,376 A | 8/1972 | Lessard | |
| 3,737,232 A | 6/1973 | Millburn, Jr. | |
| 3,782,822 A | 1/1974 | Spence | |
| 3,834,052 A | 9/1974 | Steck, III | |
| 4,026,054 A | 5/1977 | Snyder | |
| 4,027,414 A | 6/1977 | Felix | |
| 4,233,770 A | 11/1980 | de Filippis et al. | |
| T101,001 I4 | 9/1981 | Shipp et al. | |
| 4,296,725 A | 10/1981 | Broderick | |
| D268,910 S | 5/1983 | Shipp et al. | |
| 4,514,907 A | 5/1985 | Saltzman | |
| 4,516,296 A * | 5/1985 | Sherman | 24/279 |
| 4,531,052 A | 7/1985 | Moore | |

(Continued)

FOREIGN PATENT DOCUMENTS

EP 1804017 A1 7/2007

(Continued)

OTHER PUBLICATIONS

Improved Construction Methods, "Laser Measuring System, Impulse LX", http://www.improvedconstructionmethods.com/impulse_xl.htm.

(Continued)

*Primary Examiner*—John Ricci
(74) *Attorney, Agent, or Firm*—Kinney & Lange, P.A.

(57) ABSTRACT

An adaptor for a device mount that is used to mount a device such as a video camera, rangefinder or a game caller is provided. In one embodiment, the adapter includes a threaded attaching portion and an engaging cylinder. The threaded screw portion is adapted to engage internal threads in a bore of a structure. The engaging cylinder is coupled to the threaded attaching portion. The surface of the engaging cylinder is adapted to engage a scope mount ring.

13 Claims, 3 Drawing Sheets

U.S. PATENT DOCUMENTS

| | | | |
|---|---|---|---|
| 4,561,204 A | 12/1985 | Binion | |
| 4,597,211 A | 7/1986 | Miles | |
| 4,606,629 A | 8/1986 | Hines et al. | |
| 4,617,741 A | 10/1986 | Bordeaux et al. | |
| 4,640,258 A | 2/1987 | Penney et al. | |
| 4,643,159 A | 2/1987 | Ryan | |
| 4,730,190 A | 3/1988 | Win et al. | |
| 4,753,528 A | 6/1988 | Hines et al. | |
| 4,777,352 A | 10/1988 | Moore | |
| 4,786,204 A * | 11/1988 | Mayeda | 403/374.3 |
| 4,835,621 A | 5/1989 | Black | |
| 4,890,128 A | 12/1989 | Kania | |
| 4,910,717 A | 3/1990 | Terry | |
| 4,939,863 A | 7/1990 | Alexander et al. | |
| 4,974,575 A | 12/1990 | Mitchell | |
| D313,361 S | 1/1991 | Robinson | |
| 4,993,833 A | 2/1991 | Lorey et al. | |
| 5,020,262 A | 6/1991 | Pena | |
| 5,026,158 A | 6/1991 | Golubic | |
| 5,265,896 A | 11/1993 | Kravitz | |
| 5,297,533 A | 3/1994 | Cook | |
| 5,339,793 A * | 8/1994 | Findley | 124/89 |
| 5,373,657 A | 12/1994 | Betz et al. | |
| 5,479,712 A | 1/1996 | Hargrove et al. | |
| 5,507,272 A * | 4/1996 | Scantlen | 124/87 |
| 5,520,164 A | 5/1996 | Huddleston | |
| D371,084 S | 6/1996 | Ogawa | |
| 5,531,149 A | 7/1996 | Schubert et al. | |
| 5,575,072 A | 11/1996 | Eldridge | |
| 5,606,818 A | 3/1997 | Hardee | |
| 5,611,324 A | 3/1997 | Kursinsky | |
| 5,669,174 A * | 9/1997 | Teetzel | 42/115 |
| 5,687,910 A * | 11/1997 | King | 239/276 |
| D390,483 S | 2/1998 | Zykan et al. | |
| 5,735,257 A * | 4/1998 | Walk | 124/89 |
| 5,815,251 A | 9/1998 | Ebbets et al. | |
| 5,859,693 A | 1/1999 | Dunne et al. | |
| 5,887,375 A | 3/1999 | Watson | |
| 5,911,215 A | 6/1999 | Fisher, Jr. | |
| 5,926,260 A | 7/1999 | Dunne et al. | |
| 5,937,562 A | 8/1999 | Brough | |
| 5,944,041 A | 8/1999 | Kitchens | |
| 5,949,529 A | 9/1999 | Dunne et al. | |
| 5,973,315 A | 10/1999 | Saldana et al. | |
| D421,229 S | 2/2000 | Imai | |
| 6,029,643 A | 2/2000 | Golfieri | |
| 6,070,355 A | 6/2000 | Day | |
| 6,073,352 A | 6/2000 | Zykan et al. | |
| D432,930 S | 10/2000 | Sanoner | |
| 6,137,564 A | 10/2000 | Schmidt et al. | |
| 6,154,971 A | 12/2000 | Perkins | |
| 6,192,614 B1 | 2/2001 | Cliburn | |
| 6,252,706 B1 | 6/2001 | Kaladgew | |
| 6,269,581 B1 | 8/2001 | Groh | |
| D488,315 S | 9/2001 | Ito | |
| 6,286,796 B1 | 9/2001 | Pugliesi | |
| 6,331,887 B1 | 12/2001 | Shiraishi et al. | |
| 6,336,285 B1 | 1/2002 | Baumer | |
| 6,396,571 B2 | 5/2002 | Ohtomo et al. | |
| 6,397,483 B1 | 6/2002 | Perkins | |
| D460,367 S | 7/2002 | Apothéloz et al. | |
| D460,368 S | 7/2002 | Apothéloz et al. | |
| D460,369 S | 7/2002 | Apothéloz et al. | |
| 6,425,697 B1 | 7/2002 | Potts et al. | |
| 6,494,196 B2 * | 12/2002 | Harwath et al. | 124/89 |
| 6,526,956 B1 | 3/2003 | Hankins | |
| D472,826 S | 4/2003 | Sanoner | |
| 6,556,245 B1 | 4/2003 | Holmberg | |
| 6,615,531 B1 | 9/2003 | Holmberg | |
| 6,623,182 B2 | 9/2003 | Tatera | |
| 6,624,881 B2 | 9/2003 | Waibel et al. | |
| 6,678,988 B1 | 1/2004 | Poff, Jr. | |
| 6,681,755 B2 * | 1/2004 | Pujos | 124/89 |
| 6,693,702 B2 | 2/2004 | Rogers | |
| 6,704,097 B2 | 3/2004 | Waibel et al. | |
| 6,722,076 B2 | 4/2004 | Nielsen | |
| 6,772,076 B2 | 4/2004 | Neilsen | |
| 6,742,299 B2 | 6/2004 | Strand | |
| 6,796,038 B2 | 9/2004 | Humphries | |
| 6,819,495 B2 | 11/2004 | Shani et al. | |
| 6,886,287 B1 | 5/2005 | Bell et al. | |
| 6,886,288 B1 | 5/2005 | Yocum et al. | |
| 6,932,305 B2 | 8/2005 | Morales et al. | |
| 6,988,331 B2 | 2/2006 | Holmberg | |
| 7,006,144 B2 | 2/2006 | Holmberg | |
| 7,128,354 B2 | 10/2006 | Wu | |
| 7,269,920 B2 | 9/2007 | Staley, III | |
| 7,390,130 B2 | 6/2008 | Soulvie | |
| 2002/0067475 A1 | 6/2002 | Waibel et al. | |
| 2002/0078577 A1 * | 6/2002 | Aldred | 33/265 |
| 2002/0109057 A1 | 8/2002 | Wooten et al. | |
| 2003/0133092 A1 | 7/2003 | Rogers | |
| 2003/0163943 A1 | 9/2003 | Holmberg | |
| 2004/0000083 A1 | 1/2004 | Grant, Jr. | |
| 2004/0016169 A1 | 1/2004 | Poff, Jr. | |
| 2004/0051865 A1 | 3/2004 | Stierle et al. | |
| 2004/0079018 A1 | 4/2004 | Holmberg | |
| 2004/0114129 A1 | 6/2004 | Gogolla et al. | |
| 2004/0135991 A1 | 6/2004 | Gogolla et al. | |
| 2004/0194364 A1 | 10/2004 | Holmberg | |
| 2004/0257437 A1 | 12/2004 | Lesseu | |
| 2005/0035245 A1 | 2/2005 | Morales et al. | |
| 2005/0123883 A1 | 6/2005 | Kennen et al. | |
| 2005/0195385 A1 | 9/2005 | Holmberg | |
| 2005/0241210 A1 | 11/2005 | Karcher et al. | |
| 2005/0246910 A1 | 11/2005 | Mowers | |
| 2005/0252062 A1 | 11/2005 | Scrogin et al. | |
| 2005/0268519 A1 | 12/2005 | Pikielny | |
| 2007/0031142 A1 | 2/2007 | Moody et al. | |
| 2007/0068018 A1 | 3/2007 | Gilmore | |
| 2007/0081817 A1 | 4/2007 | Soulvie | |
| 2007/0157502 A1 | 7/2007 | Holmberg | |
| 2007/0157503 A1 | 7/2007 | Holmberg | |
| 2007/0277421 A1 | 12/2007 | Perkins | |
| 2008/0000465 A1 | 1/2008 | Holmberg | |
| 2008/0060248 A1 | 3/2008 | Pine et al. | |

FOREIGN PATENT DOCUMENTS

| | | |
|---|---|---|
| GB | 2 024 558 A | 1/1980 |
| GB | 2024558 A | 1/1980 |
| GB | 2 114 770 A | 8/1983 |
| GB | 2114770 A | 8/1983 |
| WO | WO90/12330 | 10/1990 |
| WO | WO9012330 | 10/1990 |
| WO | 2006090356 A1 | 8/2006 |
| WO | WO2006090356 A1 | 8/2006 |
| WO | 2006133029 A2 | 12/2006 |
| WO | WO2006133029 A2 | 12/2006 |

OTHER PUBLICATIONS

"Specification Sheet on the Impulse 200 LR Laser (Rangefinder)," Nov. 15, 2003, Publisher: Laser Technology Inc.

* cited by examiner

ADAPTOR FOR DEVICE MOUNT

BACKGROUND

For game hunters the ability to record the hunt in an efficient manner is desired. Moreover, the ability to attach other devices such as rangefinders and other electronic devices to the weapon in a manner that does not impede the hunt is also desired. For the reasons stated above and for other reasons stated below which will become apparent to those skilled in the art upon reading and understanding the present specification, there is a need in the art for a mount that can attach a device such an electronic device to a bow in an effective and un-intrusive manner.

SUMMARY OF INVENTION

The above-mentioned problems of current systems are addressed by embodiments of the present invention and will be understood by reading and studying the following specification. The following summaries are provided as way of examples and not by way of limitations. Moreover, the summaries may include more or less elements than are in the claims and are merely provided to give the reader a basic understanding of some of the elements of the present invention.

In one embodiment, an adaptor for a device mount is provided. The adapter includes a threaded attaching portion and an engaging cylinder. The threaded screw portion is adapted to engage internal threads in a bore of a structure. The engaging cylinder is coupled to the threaded attaching portion. The surface of the engaging cylinder is adapted to engage a scope mount ring.

In another embodiment, a device mount system for a bow is provided. The device mount system includes a bow adaptor, a scope mount ring and a device mount. The bow adaptor includes a threaded attaching portion and an engaging cylinder. The threaded attaching portion is adapted to engage the internal threads of a counterweight bar insert of a bow. The engaging cylinder is coupled to the threaded attaching portion. The scope mount ring is adapted to selectively engage a surface of the engaging cylinder of the bow adaptor. The device mount is adapted to selectively engage the scope mount ring. Moreover, the device mount is further adapted to hold a device.

In yet another embodiment, a method of attaching a device to a bow is provided. The method comprises attaching a bow adaptor to the bow. Engaging a scope mount ring about an engaging cylinder of the bow adaptor. Coupling a device mount to the scope mount ring and securing a device to the device mount.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
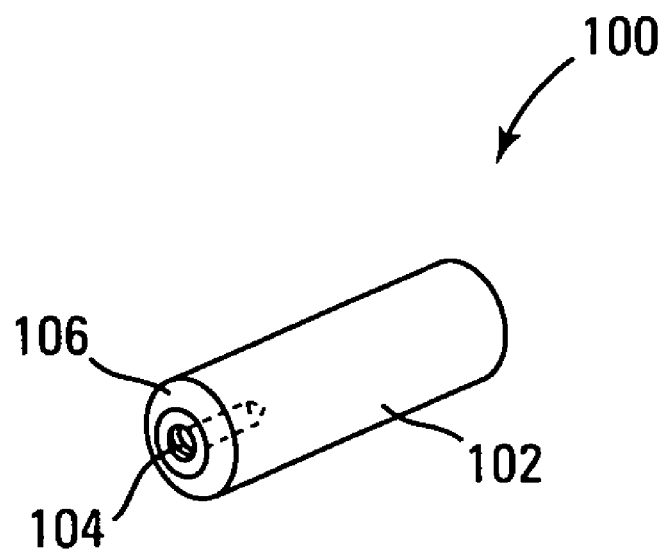
FIG. 1 is a side perspective view of an adaptor of one embodiment of the present invention.
Figure 2:
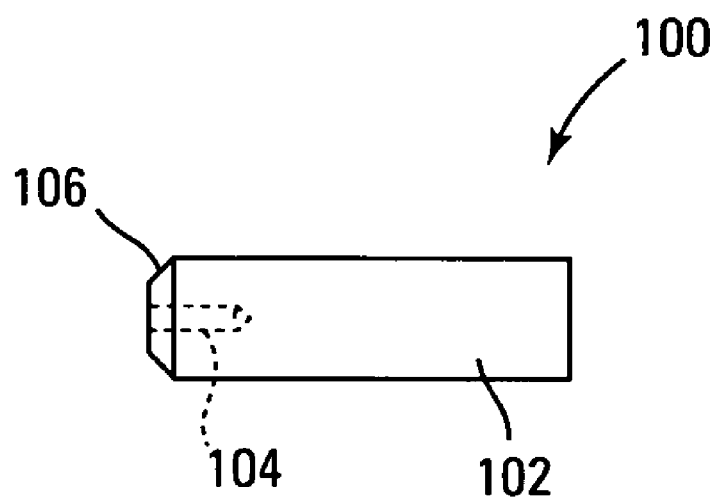
FIG. 2 is a side view of the adaptor of FIG. 1.

Embodiments of the present invention provide a bow adapter that is used in combination with a device mount to mount a device to a bow. The device being a device used for hunting such as a video camera, a rangefinder, a game caller and the like. Referring to FIG. 1, an adapter 100 of one embodiment of the present invention is provided. As illustrated, the bow adapter 100 includes an engaging cylinder 102, a tapered neck portion 106 and a threaded bore 104. A side view of an adaptor 100 is further illustrated in FIG. 2.

Figure 3:
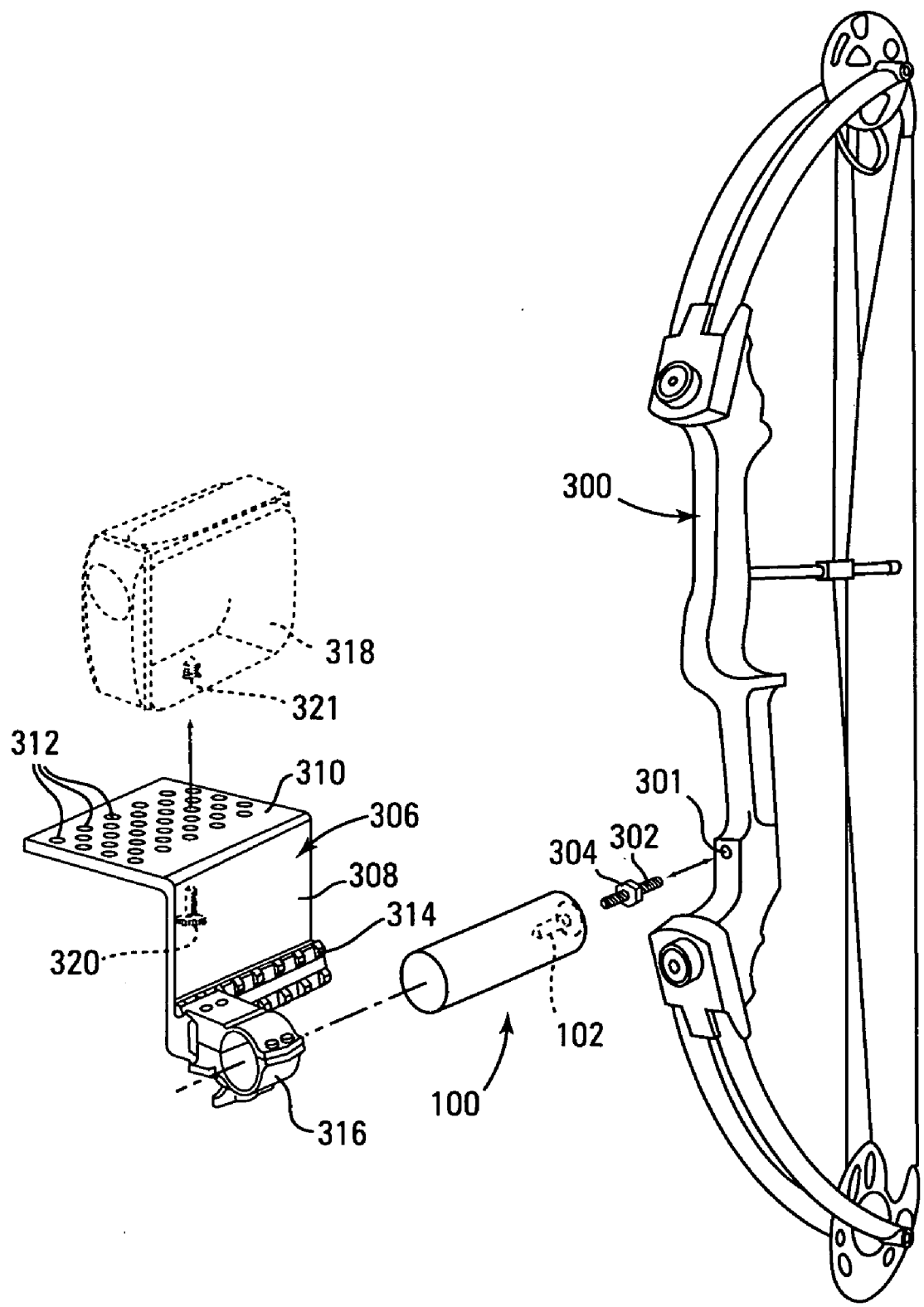
FIG. 3 is a side perspective view of the adaptor of FIG. 1 in use.

FIG. 3 is a side perspective view of the adaptor 100 of FIG. 1 in use. As illustrated, a threaded attaching portion 302 is received in bore 102 of the adaptor 100. The threaded attaching portion 392 is then threadably engaged with internal threads in bore 301 in a structure 300. The structure 300 illustrated in FIG. 3 is a bow 300. In particular, the bore 301 in this example, is a threaded counterweight bar insert 301 of the bow 300. A tightening nut 304 is used to secure the adapter 100 to the structure 300 once the threaded attaching portion 302 is threadably engaged with internal threads of the insert 310. In particular, the nut 304 is tightened to selectively abut a surface of the structure 300 about the bore 301.

A scope mount ring 316 is then attached around a surface of the engaging cylinder 102 as illustrated in FIG. 3. In particular a circular bracket of the scope mount ring 316 is secured around the surface of the engaging cylinder 102. In one embodiment, the scope mount ring 316 is a commercially available scope mount ring 316. The scope mount ring 316 is in turn coupled to a mounting rail 314 on a mount device 306 by placing the mounting rail 314 in a mounting track of the scope mount ring 316. As illustrated, the position of the scope mount ring 316 can vary along the mounting rail 314 such that the device mount 306 can be adjusted in position in relation to the structure 300. The device mount 306 includes a side plate or side portion 308. As illustrated the mounting rail 314 extends from the side plate 308. The device mount 306 further has a support plate or support portion 310 that extends from the side plate 308. The support plate 310 is designed so that a device can rest thereon. The support plate 310 is this embodiment includes a plurality of mounting apertures 312. A device 318 is mounted to the support plate 310 via a selected mounting aperture 312. In particular, a thumb screw 320 or other threaded device, is passed through the selected mounting aperture 312 and threadably engages an internally threaded bore 320 in the device 318 to mount the device 318 to the device mount 306. Providing a plurality of mounting apertures 312 allows for the adjustment in positioning of the device 306 on the mount as well as allows for different types of devices to be used.

In some embodiments, the device can be any device used in hunting such a video camera, rangefinder and the like. In one embodiment, the device is a game caller 318. In this embodiment, the game caller 318 has an internally threaded bore 321 in its housing. The internal threads are designed to engage external threads of the thumb screw 320 or other threaded device used to mount the game caller 318 to the device mount 306.

Figure 4:
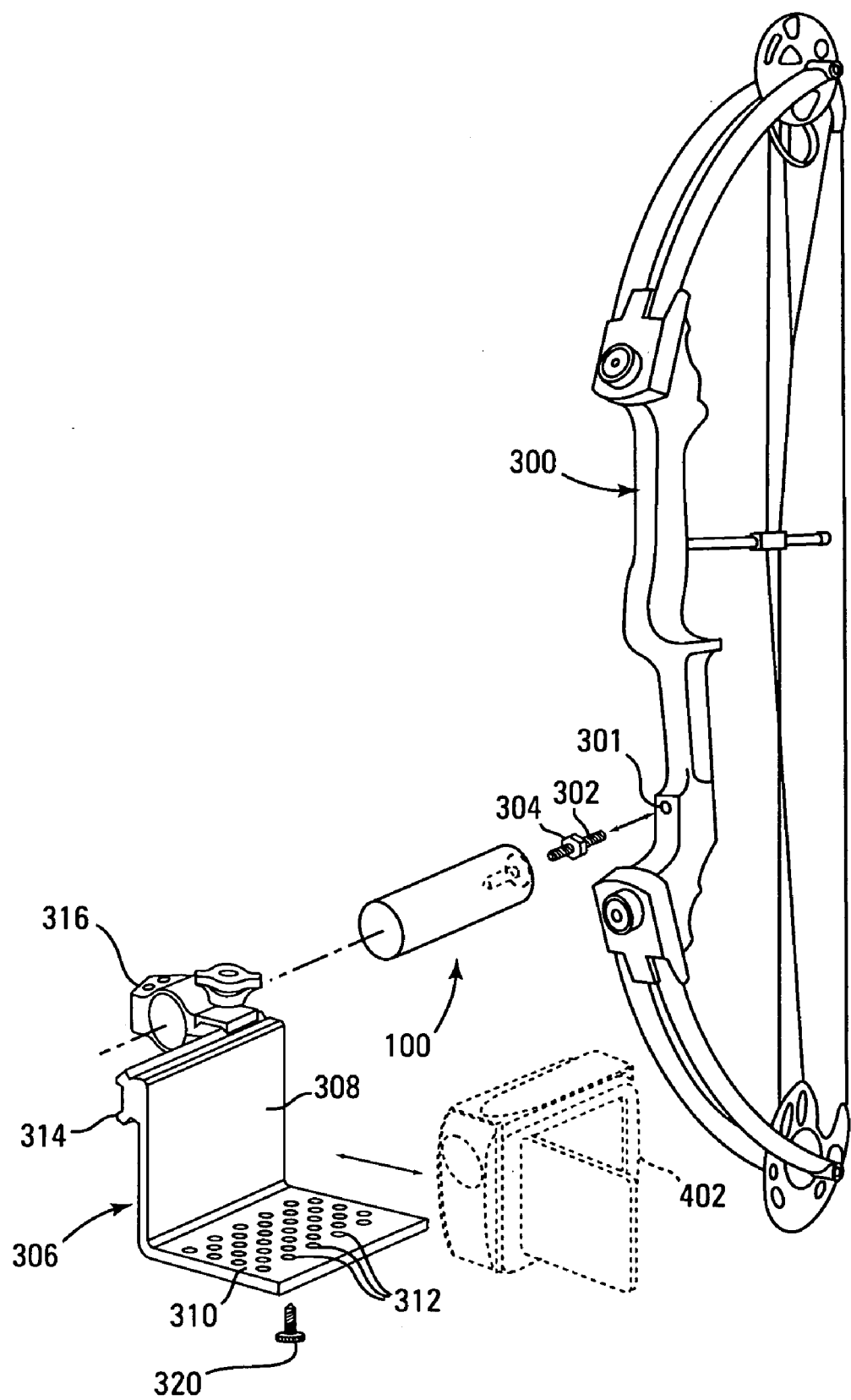
FIG. 4 is also a side perspective view of the adaptor of FIG. 1 in use.

FIG. 4 is another side perspective view of the adaptor 100 of FIG. 1 in use. FIG. 4 further illustrates that the position of the device mount 306 can change in relation to the adaptor 100 to adjust the position of the device 402 in relation to structure 300. In particular, in FIG. 4, the support plate 310 is positioned below the adaptor 100, while in FIG. 3, the support plate 310 is positioned above the adaptor 100. Although, the device illustrated in FIG. 4, is a video camera 402, any other type of device with an internally threaded bore could be used.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A device mount system for a bow, the device mount system comprising:
   a bow adaptor, the bow adaptor including,
      a threaded attaching portion adapted to engage the internal threads of a counter-weight bar insert of a bow; and
      an engaging cylinder coupled to the threaded attaching portion;
   a scope mount ring adapted to selectively engage a surface of the engaging cylinder of the bow adaptor; and
   a device mount adapted to selectively engage the scope mount ring, the device mount further adapted to support an electronic device, the device mount having a support portion adapted to support the electronic device and a side portion coupled to the support portion, the side portion having a first side positioned generally at a right angle to the support portion, the side portion further having a second side, the second side having a mounting connection portion adapted to selectively engage the scope mount ring.

2. The device mount system of claim 1, wherein the bow adaptor further includes, a nut engaged with the threaded attaching portion to selectively abut a surface of the bow about the counterweight bar insert to lock the bow adapter to the bow.

3. The device mount system of claim 1, wherein the bow adaptor further includes, a tapered neck portion between the threaded attaching portion and the engaging cylinder.

4. The device mount of claim 1, wherein the device is at least one of a video camera, a rangefinder and a game caller.

5. The device mount system of claim 1, wherein the support portion further includes at least one aperture.

6. The device mount system of claim 5, further comprising:
   a thumb screw adapted to pass through the at least one aperture and engage a threaded bore in the device to secure the device to the device mount.

7. A method of attaching a device to a bow, the method comprising:
   obtaining a mount system that includes a bow adaptor having a longitudinally elongated cylindrical engagement section, a scope mount ring and a device mount with a support plate;
   attaching a longitudinal end of the bow adaptor to the bow so as to cantilever the bow adaptor from the bow;
   engaging the scope mount ring about the cylindrical engagement section of the bow adaptor;
   coupling the device mount to the scope mount ring; and
   securing an electronic device to the support plate.

8. The method of claim 7, wherein attaching the bow adaptor to the bow further comprises:
   engaging external threads of a threaded attaching portion of the bow adaptor with internal threads in a counterweight bar insert of the bow.

9. The method of claim 8, further comprising:
   turning a nut engaged with the external threads of the screw attaching portion against a portion of the bow adjacent the counterweight bar insert.

10. The method of claim 7, wherein coupling the scope mount ring to the cylindrical engagement section of the scope mount further comprises:
    positioning a circular bracket of the scope mount ring around cylindrical engagement section; and
    tightening the circular bracket.

11. The method of claim 7, wherein coupling the device mount to the scope mount ring further comprises: placing a mounting rail of the device mount in a receiving track of the scope mount ring.

12. The method of claim 7, wherein securing the device to the device mount further comprises: engaging internal threads in a bore in the device with external threads of a thumb screw that is positioned through a mounting aperture in a support plate of the device mount.

13. A device mount system for a bow, the device mount system comprising:
    a bow adaptor, the bow adaptor including,
       a threaded attaching portion adapted to engage the internal threads of a counter-weight bar insert of a bow;
       an engaging cylinder coupled to the threaded attaching portion; and
       a tapered neck portion located between the threaded attaching portion and the engaging cylinder;
    a scope mount ring adapted to selectively engage a surface of the engaging cylinder of the bow adaptor; and
    a device mount adapted to selectively engage the scope mount ring, the device mount further adapted to support an electronic device.

* * * * *

UNITED STATES PATENT AND TRADEMARK OFFICE
CERTIFICATE OF CORRECTION

PATENT NO.        : 7,647,922 B2  
APPLICATION NO.   : 11/478943  
DATED             : January 19, 2010  
INVENTOR(S)       : Larry Holmberg Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this

Sixteenth Day of November, 2010

David J. Kappos  
*Director of the United States Patent and Trademark Office*